(12) United States Patent
Eftekhari

(10) Patent No.: US 7,184,024 B2
(45) Date of Patent: Feb. 27, 2007

(54) METHOD AND APPARATUS FOR MAPPING AN INPUT LOCATION WITH A DISPLAYED FUNCTIONAL REPRESENTATION

(75) Inventor: Jamshid Eftekhari, Stenlose (DK)

(73) Assignee: Nokia Corporation, Espoo (FI)

(*) Notice: Subject to any disclaimer, the term of this patent is extended or adjusted under 35 U.S.C. 154(b) by 978 days.

(21) Appl. No.: 09/766,022

(22) Filed: Jan. 19, 2001

(65) Prior Publication Data

US 2002/0024505 A1    Feb. 28, 2002

Related U.S. Application Data

(63) Continuation-in-part of application No. 09/607,717, filed on Jun. 30, 2000, now abandoned.

(51) Int. Cl.
*G09G 5/00* (2006.01)
(52) U.S. Cl. ............... 345/169; 345/170; 345/172; 455/566; 455/575; 715/501.01; 715/513
(58) Field of Classification Search ........ 345/156–172; 707/1–5; 455/550, 566; 315/501.1, 513, 315/613
See application file for complete search history.

(56) References Cited

U.S. PATENT DOCUMENTS

| | | | |
|---|---|---|---|
| 5,607,048 A * | 3/1997 | Kaizu et al. ............... 200/314 |
| 5,612,692 A * | 3/1997 | Dugas et al. ............... 341/22 |
| 5,911,485 A | 6/1999 | Rossmann |
| 6,046,730 A * | 4/2000 | Bowen et al. ............... 345/168 |
| 6,275,575 B1 * | 8/2001 | Wu ........................ 379/202.01 |
| 6,310,609 B1 * | 10/2001 | Morgenthaler ............... 345/170 |
| 6,359,270 B1 * | 3/2002 | Bridson ....................... 219/679 |
| 6,370,518 B1 * | 4/2002 | Payne et al. ..................... 707/1 |
| 6,405,061 B1 * | 6/2002 | Bae ............................. 455/566 |
| 6,463,304 B2 * | 10/2002 | Smethers .................... 455/566 |
| 6,593,944 B1 * | 7/2003 | Nicolas et al. .............. 345/744 |
| 6,781,575 B1 * | 8/2004 | Hawkins et al. ............ 345/173 |
| 6,952,799 B2 * | 10/2005 | Edwards et al. ......... 715/501.1 |

FOREIGN PATENT DOCUMENTS

EP    0 637 171 A2 *    8/1994
WO   WO 00/21265         4/2000

OTHER PUBLICATIONS

U.S. Appl. No. 08/843,953, Nokia Mobile Phones, Ltd.

* cited by examiner

*Primary Examiner*—Richard Hjerpe
*Assistant Examiner*—Jennifer T Mguyem
(74) *Attorney, Agent, or Firm*—Harrington & Smith, PC

(57) ABSTRACT

A user interface is disclosed which may take a data stream, or file having hyperlinks or functional text embedded therein. The CPU of the user interface may select distinct colors for each hyperlink so that such links are distinguishable. The color selection may be made so that each link has a button that that has a matching color for at least one hyperlink. The user interface associates a button having a color with a hyperlink having the same color, such that when the button is actuated, programmed execution of the function associated with the hyperlink occurs. Thus a mapping of button, to color, to hyperlink, to function may be established.

30 Claims, 5 Drawing Sheets

| 451<br>LINK<br>NAME | 452<br>COORDINATES | 453<br>BUTTON<br>LABEL | 454<br>COLOR<br>ASSOCIATION |
|---|---|---|---|
| A | 1,1 | | |
| B | 3,2 | | |
| C | 1,3 | 476 | |
| D | 1,5 | ⟷ 1 | RED — 466 |
| E | 1,6 | ⟷ 477 2 | YELLOW — 467 |
| F | 1,7 | ⟷ 3 | GREEN — 468 |
| G | 1,8 | ⟷ 478 4 | LIGHT PURPLE — 469 |
| H | 1,10 | 479 5 | ORANGE |
| I | 1,11 | ⋮ | |
| J | 1,12 | 0 | LIGHT BLUE — 499 |

```
<!DOCTYPE wml PUBLIC "-//WAPFORUM//DTD WML 1.1//EN" "http://www.wap
forum.org/DTD/wml.xml">
```

601 — `<wml>`
   `<card id="card1" title="title">`

`<p>`
603 — hello world

605 { `<input type="text" name="1" title="First name" accesskey="1"/>`
   with 606 over `type="text" name="1"`, 607 over `title="First name"`, 609 over `accesskey="1"`

615 { `<input type="text" name="first1" title="First name" value="Hello" accesskey="0"/>`
   with 616 over `type="text" name="first1"`, 617 over `title="First name"`

625 { `<anchor accesskey="9">random<go href="random/random.wml"/></anchor>`
   with 619 under `accesskey="9"`, 626 over `href="random/random.wml"`, 629 under `random`, 627 under `<go`

`</p>`
   `</card>`
   `</wml>`

*FIG. 6*

METHOD AND APPARATUS FOR MAPPING AN INPUT LOCATION WITH A DISPLAYED FUNCTIONAL REPRESENTATION

This invention is a continuation in part to U.S. application Ser. No. 09/607,717 filed Jun. 30, 2000 now abandoned.

FIELD OF INVENTION

This invention relates to providing a graphical user interface, and more particularly to providing input selection through an input device that has localized lighting near pressure actuated input surfaces.

BACKGROUND OF THE INVENTION

Program control of a CPU, e.g. a in personal computer, is frequently driven by user inputs via a keyboard or other discrete input device. A key, sometimes called a button, or keypad, often has a preprinted number, letter or symbol appearing on it. This provides a user with an understanding of a function that the key is generally supposed to trigger.

A function of a key may vary according to the state of the CPU, also known as the context of the CPU. For example, pushing a key denoted as 'Caps Lock' on its surface, will trigger a toggling of a QWERTY keyboard between lower-case and upper-case keyboard input. Similarly, use of the 'function' key or 'control' key on modern personal computers causes keys to take on a myriad of functional abilities, depending on the program operating on the Personal Computer or PC.

In some cases of controlling a CPU, it is unnecessary to mark a key with any symbolic notation to indicate its purpose. This is most evident in many Automated Teller Machines (ATM). In such cases, the buttons are located adjacent to the display area such that when text appears adjacent to a given button, it is obvious, due to the proximity of the text to the button, what is the intended functionality of that button upon actuation. ATMs naturally, are very specific purpose machines, and so the arrangement of text to describe button functions varies according to a very predictable and limited program.

The category of hyperlink includes functional text, i.e. hypertext, or functional graphics. Each hyperlink has an associated function or hyperlink function. A hyperlink function may cause any change in the output or storage of any device operatively coupled to the CPU of the browser device. Hypertext is commonly used with the World Wide Web (WWW). Unlike ATMs, a functional text, or a graphic as found on the WWW, may appear anywhere on a display, and is seldom restricted to orderly columns or rows of presentation. More importantly, in a desktop environment, keys are so far from the display, that even if functional text or graphics were located at the periphery of the display, an average user might find it difficult to see a correlation between keys on a PC keyboard and displayed text or graphics.

Fortunately, many techniques for using pointing devices remove the need for such an arrangement. Even before mice were available, menus provided similar ability to call on functions. A menu, or submenu item, would have a precursor number, or letter, set apart from, or highlight within, functional text. A typical menu, once displayed, is operated in tandem with a input routine that permits a selection upon the occurrence of a single keystroke, wherein the selected function is denoted by the functional text of the menu item, and the operating key, by a single highlighted symbol therein.

The use of hypertext has become so advanced that today, routinely, hypertext is created in Hyper Text Markup Language (HTML), Wireless Markup Language (WML) and other markup languages such that displayed text, may operate as a doorway to additional functions by simply moving a cursor to the displayed text and clicking on it. Among the many features of HTML, when read by a compatible browser, is the ability to give hypertext a color of its own, to separate the text from non-functional text, and otherwise provide a pleasing color combination with other parts of a HTML page. The ability to specify the color of a link, within the HTML file, is done for aesthetic reasons so as to maintain a consistent theme through a family of HTML pages.

Among the features of WML, when read by a compatible browser, is the ability to identify a key, usually by the insignia printed on the key, that will operate to trigger the hyperlink associated with an anchor, see e.g. Wireless Application Protocol Wireless Markup Language Specification Version 1.3, © Wireless Application Protocol Forum, Ltd. 2000. Therein is specified as well, other input means including the select element, the option element and the input element. Unfortunately, for the WML language and others like it, there persists the need to highlight or otherwise correlate (sometimes with additional text) a hyperlink (or other input element) with symbols in use on common keyboards, or other character entry devices. Because of the scarcity of display real estate in many mobile devices, use of fewer pixels showing keypad controls provides an opportunity to squeeze a bit more data into the display.

In a situation of handheld computers, sometimes embedded in mobile stations, such as mobile phones, the ATM-like keys are known as soft-keys. Like the ATM, the soft-keys are mounted very close to a display surface, e.g. about ¼ inch. In contrast to a typical laptop—the nearest keys on an IBM® ThinkPad are about 1 ¼ inch away from a display surface. Even though the mobile station has a minimal distance, many people are unable to make the connection between the softkey and the intended function displayed nearby. In such instances, much of the functionality of the mobile phone is hidden from the person using the phone.

Because a mobile station is used frequently as a personal communication device, it has versatility not present in wired phones. Consequently, the mobile station has been designed for use in all manner of conditions, including darkness. Thus the keypads are often designed to illuminate from within when entries are being made. Because the purpose has been to improve visibility of keys, the lighting is usually uniform to all keys, and has been monochromatic.

Since a hand-held unit, and in particular a mobile phone, must devote space for a 12-key keypad, the room allowed for a display is frequently small, e.g. about 5–6 lines of text. Although a mouse of diminutive proportions could be added using a J-key sensor, fine cursor movement through such a small screen would yield markedly diminished results as compared to use with desktop sized monitors. None-the-less, requiring a user to use a cursor advance function, such as employed by the use of the 'tab' key in the popular text browser, LYNX, is inefficient, particularly as the operable choices start to exceed four. This becomes more taxing on the user of a device when a keypad has key-sizes less than a quarter of the area of the DIN-standard form factor of computer keyboards.

Hence, a need exists for a selection method and apparatus to reduce repetitive keystrokes on hand-held devices that provide hyperlinks visible on a display. A need exists to form a visible link between a key on a keypad and a hyperlink on a screen without crowding keys around the display. An ability to obtain greater functionality from a standard key layout is also needed.

SUMMARY OF THE INVENTION

The present invention provides a method and apparatus for selecting a function in an input device. A first function is displayed as a first depiction highlighted using a first color. A second function is displayed as a second hyperlink depiction highlighted using a second color. A color selection is made from among the first color and second colors, which is detected by, e.g. a CPU. The CPU branches program execution to select a function based on the color selection.

An embodiment of the invention may read a hypertext file or list, and assign colors to hyperlinks that are visible in the physical display of a device. Color assignment may override any color assignment in the native HTML for a hyperlink so that each hyperlink that points to a unique function has a unique color assigned to it, yet the hyperlink is depicted with a color that matches at least one key of a keypad. Also, assignment of color may be utilized in the creation of a data structure, e.g. a lookup table, indexed by color, and matching a function. Upon the selection of a color, the matching function is triggered by a CPU.

Another embodiment of the invention may receive a request to read a hypertext deck. The embodiment may disable lighting to at least one key. Then it reads the hypertext deck having distinct keys associated with each hyperlink. For each key that is identified as actively associated with a link specified in the deck, the embodiment may light the key associated with the link. An advantage provided by one or more embodiments of the invention is that highlighted portions of a display, and any corresponding function, may be selected by inputting a unique color associated with the function. This may be done with a single keystroke, even though there may be many choices visible on the screen.

Among the many advantages of the present invention, one or more of the disclosed embodiments provides that each button of a handheld device may have a unique color, which matches a function listed on the display. Anyone who perceives color can select a function from the keypad that matches the display.

Another advantage provided by one or more embodiments is that on a device controllable chiefly with buttons, a method is provided that permits selection of any listed item with a single keystroke, without the need to find a matching symbol to the listed item on a button. This is true even though there may be many listed items or hyperlinks.

Another advantage provided by one or more embodiments is that recognition of a linkage between a button and a displayed function is improved so that people who are illiterate may still see the connection between a distant button and a displayed hyperlink depiction having a color in common with the button. Moreover, persons with moderate sight impairment may better locate buttons having color from edge-to-edge, than locate one of several characters that appear on a button face.

Another advantage provided by one or more embodiments is that there is no difficulty reading button colors, even though a device may be oriented upside down, with respect to characters printed on buttons.

Another advantage provided by one or more embodiments is that the display, though it may be too full of links to see a positional correlation with nearby buttons, is still close enough to the buttons, that the button colors may be seen with peripheral vision. This permits a button selection that is accurate in terms of selecting the matching hyperlink depiction—while never glancing away from the display.

Still another advantage of an embodiment may offset the fact that a key's function may be implicit in its location, or hinted at by the displayed name of a link. To reduce the ambiguity relating which among many keys will be active in relation to a displayed link or other markup language tag, only keys that are tied to a markup language tags of the deck may be illuminated, e.g. by LEDs from below.

BRIEF DESCRIPTION OF THE DRAWINGS

The disclosed inventions will be described with reference to the accompanying drawings, which show important sample embodiments of the invention, wherein:

FIG. 6 shows an example of a markup language deck used as an instruction to illuminate some of the keys.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1A:
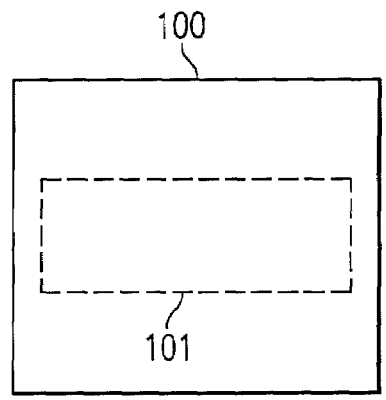
FIG. 1a is a representation of a formatted hyperlink file as it would appear if displayed to a screen having large dimensions.
Figure 1B:
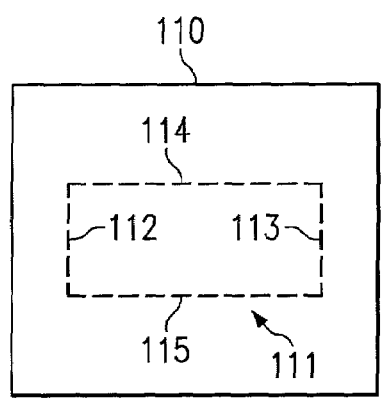
FIG. 1b is a representation of a viewable window superimposed on a virtual screen, wherein the virtual screen is larger in all dimensions than the viewable window.

FIG. 1a shows a representation of a formatted hyperlink file as it would appear if displayed to a screen having large dimensions. Since most formatted hyperlink files—such as would be produced by a conventional desktop browser on a html file—are suited for 'fat' browser capability, very frequently, a display on a mobile station is unable to show the entirety of the formatted hyperlink file. Under such circumstances, a mobile station may provide a 'scrolling' capability similar in effect to the scrolling performed on a conventional html page when it is not visible in the display area of a computer display. The excess formatted hyperlink file is called a virtual screen 100. The area of the virtual screen 100 that may be seen in the display of a device, such as, e.g. a mobile station, is called the viewable window 101. FIG. 1b shows a viewable window 111 that is so small that the excess of the virtual screen 110 extends beyond the left 112 and right edges 113 as well as the top 114 and bottom 115 edges of the viewable window.

The formatted hyperlink file, is more than raw hypertext, it is a representation, in the order and orientation, of text and graphics, that an author intended the file to have when viewed by human eyes. The formatted hyperlink file has a number of functional areas, which are often visible with specialized cues. As an example, Hyper Text Markup Language (HTML) authors frequently use the default specialized cue of an underscore and blue coloring to identify functional area relating to some text. When presented by a browser using conventional HTML, an image can have a specialized cue, sometimes denoted by a blue border. In a general sense, these specialized cues are a highlight to the functional area, and have virtually always been a uniform color for a given formatted hyperlink file. A formatted hyperlink file may be a filtered version of HTML, such as produced by a Web Clipping Application (WCA). A formatted hyperlink file may be very short and includes lists of functions displayed in a column.

Figure 2:
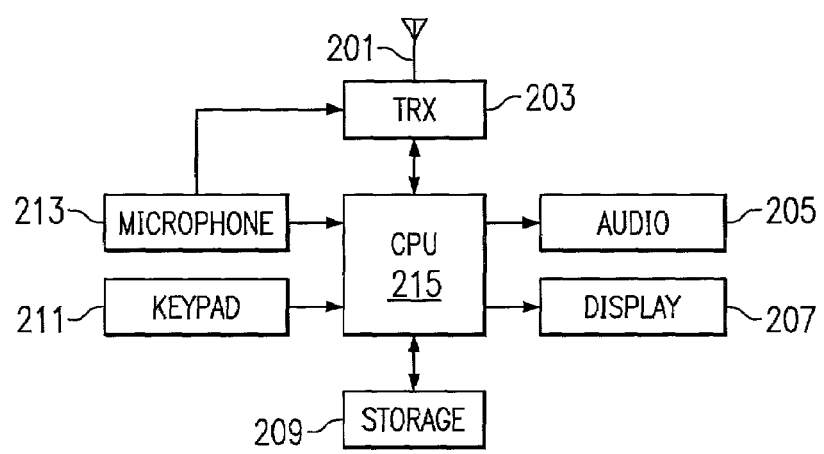
FIG. 2 is a block diagram of a mobile station embodiment of the invention.

FIG. 2 shows the hardware of a typical mobile station. The mobile station may be a mobile phone. The mobile station may be a personal digital assistant. An antenna 201 may be used to receive signals and transmit signals. Transceiver 203 may provide the ability to convert signals from analog to a digital baseband signal and from a digital baseband signal to analog. Processor or CPU 215 may receive data from the transceiver 203 and provide such data as analog or digital signals to output devices. An audio output or audio renderer 205 provides a sound output. Audio output 205 may take its input in analog or digital form from the processor 215. Processor may provide output to a display 207. The display 207 may be a LCD, LED a raster scanning device among others. Processor 215 may rely on storage 209 for occasional storage and retrieval of data. Such data may include information providing a context of a state machine, or other program. Such data may include audio or visual data in compressed or uncompressed formats.

FIG. 2 also shows some input devices. An actuating means 211 may include a device capable of detecting inputs along a two-dimensional plane, including keypads, touchpads, graphic tablets and mice. Inputs may be converted to a digital signal and fed to the processor 215 for action in accordance with program control. In some cases, a input means may be overlaid over, or interspersed with some display elements, or illuminating means. Microphone 213 may provide voice control inputs to the processor 215. Microphone may provide a communication signal to the transceiver 203. Transceiver 203 may provide analog to digital conversion of voice signals from the microphone 213.

Figure 3:
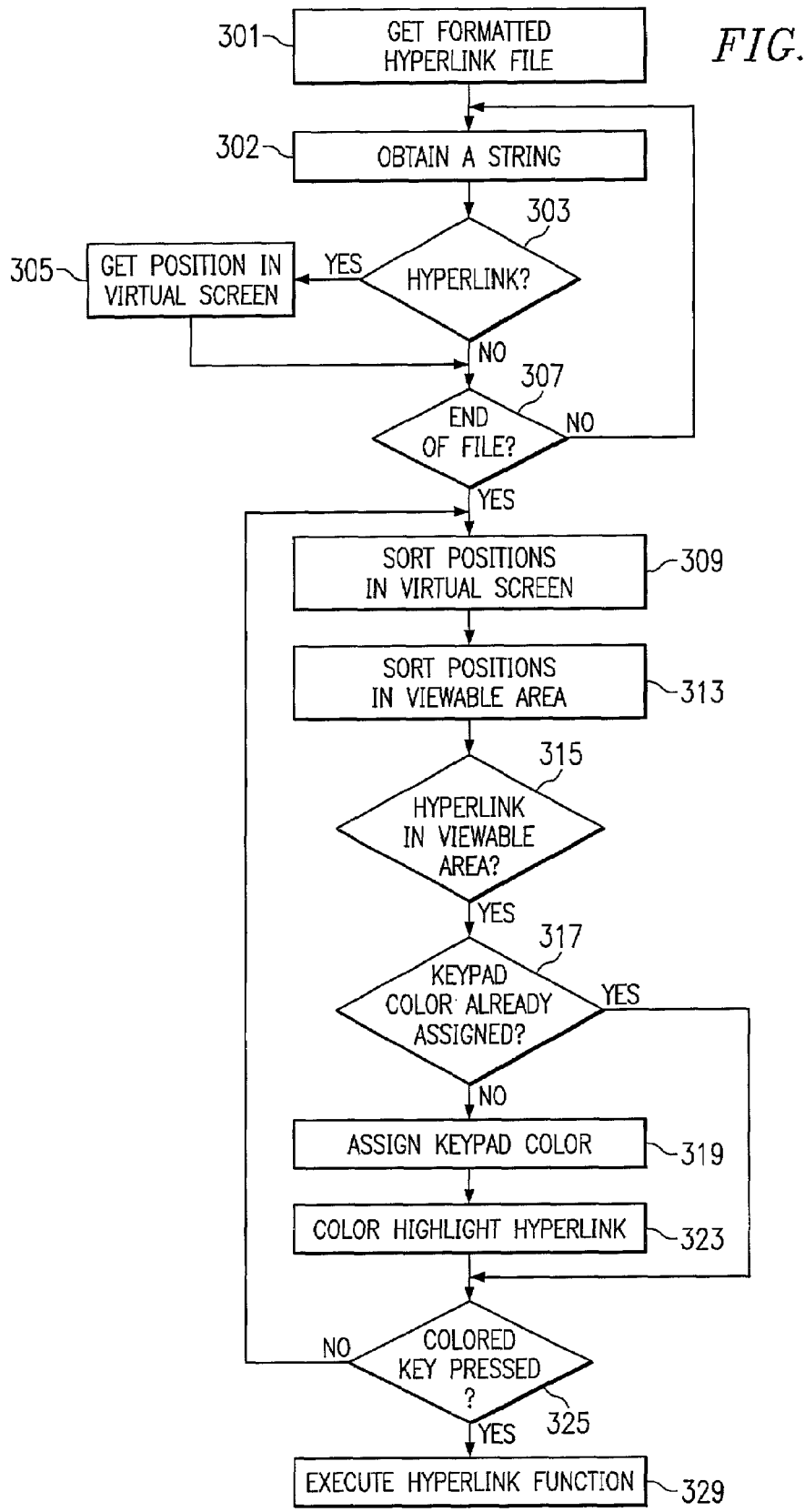
FIG. 3 is a flow chart of the steps performed by an embodiment of the invention.

An embodiment of the invention, executing on a mobile station, performs the steps of FIG. 3. A formatted hyperlink file is obtained 301, either through a communications port, from another process or from local storage. A CPU on the browsing device parses 302 the formatted hyperlink file. A determination may be made at each delimiter, to see if a string of the formatted hyperlink file is a hyperlink 303. Such a method of determination is well known in the art. If the string is a hyperlink, then a determination is made of the position the link would appear in on a two-dimensional virtual screen 305. Such a position may be stored in a data structure, e.g. a list, having storage of the hyperlink string, a horizontal or x position, a vertical or y position. The steps of parsing, and list storing 305 may be executed iteratively until a end of file is detected 307.

The list may be sorted 309 left to right for each row, and then arranged so that hyperlinks in rows positioned at larger 'y' positions are closer to the end of the list than hyperlinks in rows at smaller 'y' positions. The sorting of the sort step 309 may be in an order consistent with the way text is read by a person who reads from left to right. Sorting may also be consistent with an input device order. The input device order may be based on the arrangement of the actuating means, e.g. the order of keys 1 through 0 on a 12-button keypad in common use on telephones. A viewable window may be smaller than the virtual screen. In that case, a sub-list is created 313, wherein the sub-list organizes the visible hyperlinks depictions, i.e. the hyperlinks depictions appearing, at least in part, within the viewable window. A test may be made to determine if a hyperlink depiction appearing in the sub-list has an assigned color 317, that is a color selected by the CPU that overrides any color native to the formatted hyperlink file. A keypad color may be selected 319 that is among a set of keypad colors that are not assigned. Some hyperlinks may no longer be visible on the viewable window following input by a user to scroll the display. In that case the color assigned to the hyperlink may be added to a list of unallocated colors. The CPU controls the display to provide a color highlight 323 at the visible hyperlink. The visible hyperlink is a hyperlink depiction, and the arrangement of two or more hyperlink depictions on the viewable window is the depiction order. Such a color highlight may be controlled by modifying the formatted hyperlink file to embed a color tag to be associated with the hyperlink, wherein the color tag is interpreted by a browser program as a color similar to a keypad color. Alternatively, if a color tag already exists for the applicable hyperlink, the existing color tag may be modified to become a color similar to the keypad color. A color highlight may be at a hyperlink depiction when the color a) fills the hyperlink depiction; b) surrounds the hyperlink depiction; or c) is a continuous streak extending the substantial length of the hyperlink depiction, and nearby to the hyperlink depiction.

Once the keypad colors have been allocated to all hyperlinks on the viewable window, the browser device may enter a loop to obtain input 325, wherein it may poll circuits controlled by keypad keys having similar colors to the color of visible hyperlinks in order to detect a keypress. When such a keypad is pressed, a pressed keypad color or selected color is determined. The CPU may detect the selected color. The pressed keypad color may operate as an index to lookup an associated hyperlink. Alternatively, the pressed keypad color may operate as an index to lookup an associated hyperlink functional. Execution 329 by the browser device then operates according to the hyperlink function of the associated hyperlink by means well known in the art. Any color allocations may be reallocated at this time.

FIG. 3a shows an example of some hyperlinks in a virtual screen 401. A viewable window 403 occupies the midsection of the virtual screen 401. Link D 411 is located at coordinates (1,5). Link D 411, Link E 412, Link F 413 and Link G 414 are all visible within the viewable window 403.

Figures 4A, 4B:
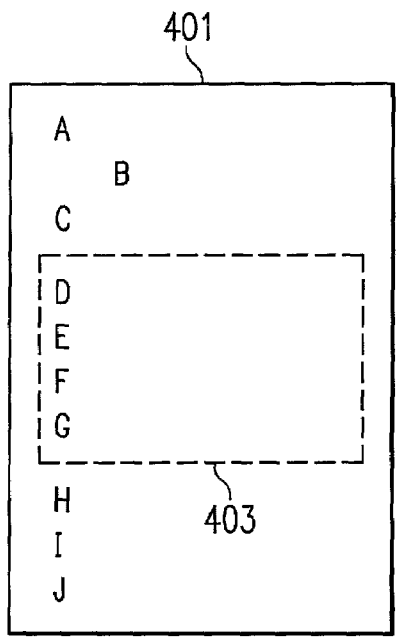
FIG. 4a shows an example of some hyperlinks in a virtual screen.
FIG. 4b shows a view of some of a data structure that may hold the location information of the hyperlinks.

FIG. 4b shows a view of some of a data structure that may hold the location information of the hyperlinks 451. Coordinate information 452 may be included, using the row and column of the link. A button label 453 and color association 454 pair may be associated dynamically to a hyperlink name 451. Associations for the current viewable window show the association 476 of link D 456 with color red 466. An association 477 of link E 457 may be made with color yellow 467. An association 478 of link F 458 may be made with color green 468. An association 479 of link G 459 may be made with color light purple 469. Such associations and lists may be made using tables, pointers, or other means known in the art. Other data may be included in the data structure. Following selection of colors by step 319 of FIG. 3, associations are made between each hyperlink visible within the viewable window and a color assigned to a keypad button.

The operation of the flowchart of FIG. 3 suggests that a color highlighting assignment to a bit of text or graphics may persist as a user scrolls a viewable window up and down. An alternative embodiment may reallocate colors based on the position or zone that a hyperlink moves to following a scroll operation. A zone may be a row of characters. Such a zone approach would entail reassigning a color of a hyperlink as the hyperlink rises in the viewable window, i.e. while the link is in the lower quarter of the window, assign a color of the lowermost row of buttons, which includes light blue 499. The next higher quarter of the screen, may then have links highlighted with colors selected among the colors of the '7', '8' and '9' buttons. Rising still further into the third highest quarter of the screen, colors associated with the '4', '5', and '6' buttons might be used. And finally, when a hyperlink is scrolled to the highest part of the viewable window, colors associated with the '1', '2' and '3' buttons may be used. A shift from one zone to the next, would entail providing a new color hyperlink depiction, and re-mapping the button that is associated with the function of the hyperlink.

Figure 5:
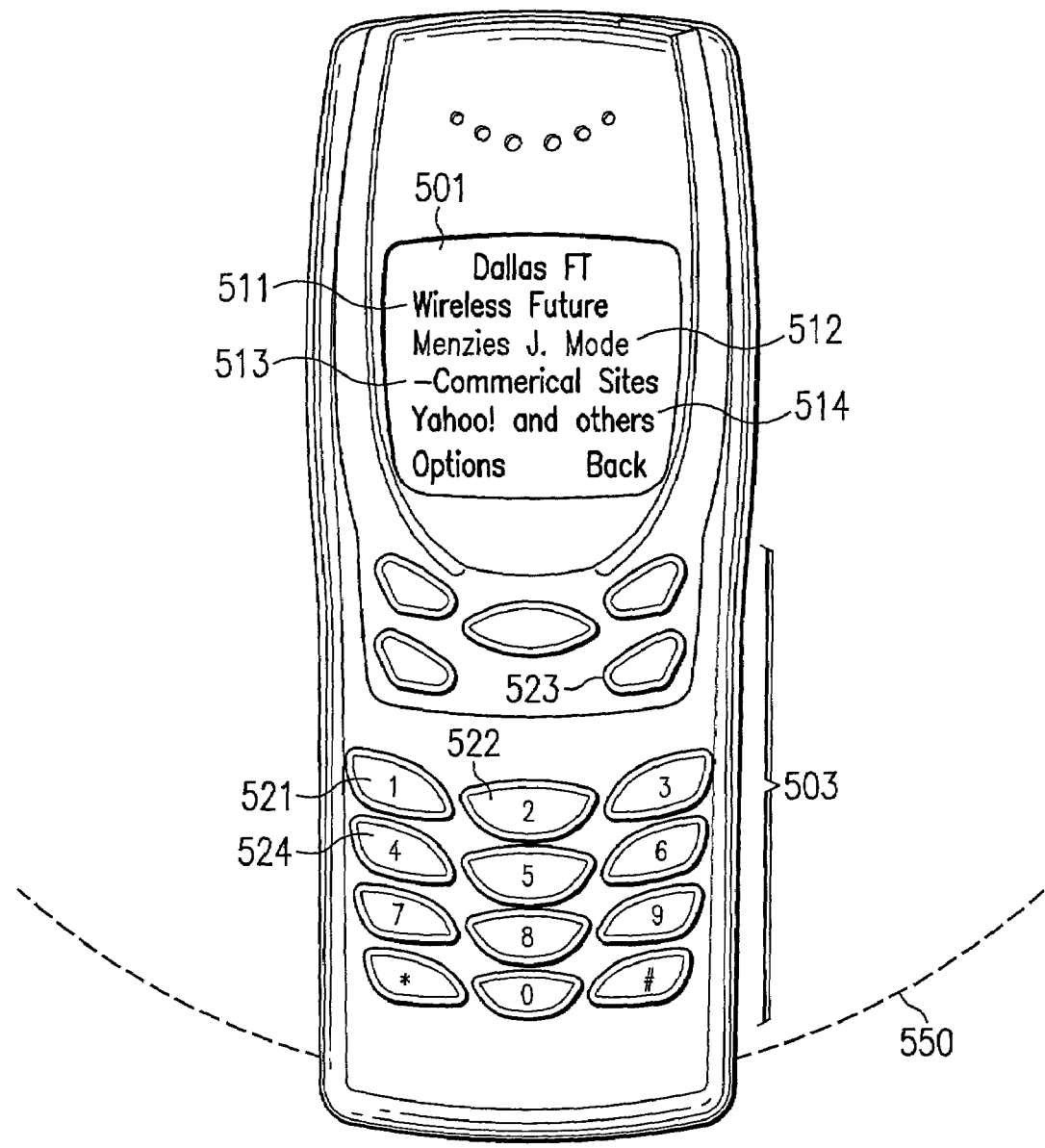
FIG. 5 shows the configuration of a keypad in relation to a display.

FIG. 5 shows the display area 501 in combination with a keypad input device 503 of a mobile station. In the display area 501 which shows a viewable window of an associated file, are four hypertext links: one that triggers display of information concerning "wireless future" 511; one that triggers display of information concerning "Menzies J Mode" 512; one that triggers display of information concerning "Commercial Sites" 513; and one that triggers display of information concerning "Yahoo! And others" 514, wherein each of the hypertext links color match: the one key 521; the two key 522; the three key 523 and the four key 524, respectively. Each key of the keypad may be large enough to fall within the peripheral vision of a user. The peripheral range 550 is the angular distance from the direction of view wherein a user may gaze directly at the display area 501 and be able to select a colored button of sufficient size according to the color desired—without the need to adjust gaze. The range, naturally, may be larger for a colored button that has a larger size, as compared to a button of smaller size. The peripheral range may vary from user to user and may be measured while the display and buttons are at a distance from an eye that is typical of a user holding the device containing the display and buttons.

In an embodiment of the invention, a browser device has color-coded keypad, wherein the occurrence of a key-press or a key release may be detectable at a CPU. The color code may be on the key or button, or in an adjacent area to the key or button.

An alternative embodiment would provide lighting to each keypad button such that a color of the button may be selected. The color may be selected by a CPU by closing a circuit to one or more different colored LEDs positioned near a keypad button. A combination of at least one light source positioned close enough to a button so as to light that button without significant illumination lighting nearby buttons is known as a button-light pairing.

FIG. 6 shows a markup language file bearing a wireless markup language (WML) tag 601 upon which an embodiment of the invention operates. The text "hello world" 603 is not active and has no navigation function associated with it. The following tag 605 carries display context 607, input field rendering instructions 606 and a coupling of the foregoing to a character-entry pressure-point, e.g. a button, 609 in the form of accesskey="1". The number in quotes, 1, is a reference to a character encoding. Such a reference could be to an alphabetical character, punctuation, or any other character that is commonly printed on or near a device button. The field has a navigation function associated with it, namely, that if the navigation function is selected, e.g. by pushing a button having the character encoding, a next keystroke will be added to the field. In this case, a CPU reading the file, associates a keystroke of a button marked with the character encoding 1, and awaits the next keystroke signal from the keypad. When a key-press of the button occurs, the CPU detects the key-press. The CPU may by means known in the art, move a cursor, or perform other navigational functions, including changing at least one pixel on the display. Each such navigational function may be associated with the markup language that appears in the rendering instructions 606. Reading this rendering instruction causes the CPU to illuminate the button via, e.g. a button-light pairing applying current to the circuit supplying light to the button marked 1.

Similarly, the rendering instruction 616 in the second input tag 615 provides a second display context 617, and an associated button 619 in the form of accesskey="0", thus associating a key-press of the button having the character encoding of 0 printed on or near with a second input field. Reading this rendering instruction causes the CPU to illuminate the button via, e.g. a button-light pairing applying current to the circuit supplying light to the button marked 0.

Finally, the rendering instruction 627 in the hyperlink anchor tag 625 provides a navigational function href="random/random.wml" 626. Associated with the navigational function is the encoded character 9, which appears in button reference 629. A display context 627 may be displayed on a display. Reading this rendering instruction causes the CPU to illuminate the button via, e.g. a button-light pairing applying current to the circuit supplying light to the button marked 9.

Upon reading each association of a button appearing in the first input field 606, second input field 616, and the hyperlink anchor tag 626, the CPU illuminates the 1, 0 and 9 buttons respectively. Cursor movement, movement between cards in a deck and other navigational functions may be selected upon detecting a key-press of a button, i.e. a cursor may be positioned on the display responsive to a key-press. Upon detecting application of pressure to a character-entry pressure point, e.g. a key-press of the button having a '1' marking, the CPU performs the navigation function associated therewith.

Detection of a key-press may result in changing at least one pixel of the display to reflect the navigation as influenced, e.g. by cursor movement, or by rendering of another card.

Note that although a button is suggested as a possible character-entry pressure point, other suitable character entry devices that rely on pressure may be used instead. Other character-entry pressure points, i.e. devices that actuate based on a pressure, include but are not limited to, roller keys, touch screens and the like. Illumination of such active character-entry pressure points may be such that the input surface on or around which the character appears is illuminated from behind, the side or any other direction.

Although the invention has been described in the context of particular embodiments, it will be realized that a number of modifications to these teachings may occur to one skilled in the art. The embodiments may operate within a number of different packages, e.g. a mobile phone, pager, or electronic organizer. A number of input devices could be used to detect color inputs, including any device that detects finger placement, or the coordinates of a stylus tip. Thus, while the invention has been particularly shown and described with respect to specific embodiments thereof, it will be understood by those skilled in the art that changes in form and configuration may be made therein without departing from the scope and spirit of the invention.

What is claimed is:

1. A method in a device having a plurality of character-entry pressure points for selecting a function in a markup language file comprising:
   a) reading the markup language file;
   b) detecting a reference in a handheld device to a character encoding having a corresponding function, the corresponding function being displayed in a display of the handheld device;
   c) illuminating substantially only one character-entry pressure point corresponding to the character encoding, the substantially only one character-entry pressure point being disposed in an input area of the handheld device in proximity to the display of the handheld device, wherein a color associated with a character-entry pressure point when illuminated corresponds to a color of the corresponding navigation function;
   d) detecting an entry by the character-entry pressure point; and
   e) triggering the navigation function.

2. The method of claim 1 wherein detecting an entry by the character-entry pressure point comprises detecting a key-press.

3. The method of claim 1 wherein detecting an entry by the character-entry pressure point comprises detecting a key-release.

4. The method of claim 1 wherein detecting an entry by the character entry pressure point comprises detecting a long-duration key-press.

5. The method of claim 1 wherein triggering a function comprises displaying a card that corresponds to a single character-entry pressure point.

6. The method of claim 5 wherein triggering a function further comprises reading a deck.

7. The method of claim 1 wherein triggering a function further comprises moving a cursor.

8. A method for selecting a navigation function in a markup language file comprising:
   reading the markup language file;
   detecting a reference in a handheld device to a character encoding having a corresponding navigation function, the corresponding navigation function being displayed in a display of the handheld device;
   illuminating substantially only one character-entry pressure point corresponding to the character encoding, the substantially only one character-entry pressure point being disposed in an input area of the handheld device in proximity to the display of the handheld device, wherein a color associated with a character-entry pressure point when illuminated corresponds to a color of the corresponding navigation function;
   detecting a pressure actuation of the character-entry pressure point;
   triggering the navigation function.

9. The method for selecting a navigation function of claim 8 wherein illuminating a character-entry pressure point comprises illuminating a light emitting diode (LED) near the character-entry pressure point.

10. The method for selecting of claim 9 wherein displaying a change further comprises displaying a portion of a markup language card.

11. The method for selecting of claim 10 wherein triggering comprises reading a second markup language file.

12. The method for selecting a navigation function of claim 8 wherein detecting comprises sensing a circuit closure.

13. The method for selecting a navigation function of claim 8 wherein detecting comprises sensing a long duration circuit closure.

14. The method for selecting a navigation function of claim 8 wherein detecting comprises sensing a circuit opening.

15. The method for selecting a navigation function of claim 8 further comprising color coding and displaying the navigation function on a display screen of the wireless device after detecting a reference to a character encoding having a corresponding navigation function and before illuminating a character-entry pressure point corresponding to the character encoding.

16. The method for selecting a navigation function of claim 15 further comprising reassigning the color of a navigation function when the navigation function moves on a display screen of the wireless device after triggering the navigation function.

17. A device having a plurality of character-entry pressure points for selecting a function in a markup language file comprising:
   a) means for reading the markup language file;
   b) means for detecting a reference in a handheld device to a character encoding having a corresponding function, the corresponding function being displayed in a display of the handheld device;
   c) means for illuminating substantially only one character-entry pressure point corresponding to the character encoding, the substantially only one character-entry pressure point being disposed in an input area of the handheld device in proximity to the display of the handheld device, wherein a color associated with a character-entry pressure point when illuminated corresponds to a color of the corresponding navigation function;
   d) means for detecting a entry by the character-entry pressure point; and
   e) means for triggering the function.

18. The device of claim 17 wherein the device has displayed a number of references and the means for illuminating the substantially only one character-entry pressure point comprises means for illuminating the number of character-entry pressure points.

19. The device of claim 17 wherein the means for detecting an entry by the substantially only one character-entry pressure point comprises means for detecting a key-press.

20. The device of claim 17 wherein the means for detecting an entry by the substantially only one character-entry pressure point comprises means for detecting a key-release.

21. The device of claim 17 wherein the means for detecting an entry by the substantially only one character entry pressure point comprises means for detecting a long-duration key-press.

22. The device of claim 17 wherein the means for triggering a function comprises means for displaying a card in response to a key press of a single character-entry pressure point.

23. The device of claim 22 wherein the means for triggering a function further comprises means for reading a deck.

24. The device of claim 17 wherein the means for triggering a function further comprises means for moving a cursor.

25. The device of claim 17 further comprising
means for color coding and displaying the corresponding function on a display screen of the device; and
means for reassigning a color of the corresponding function of a character encoding, wherein the color coding of each character-entry point and a corresponding character encoding have similar colors.

26. A wireless device comprising a display, a manual user data entry device, and a CPU programmed to parse a file to identify at least one occurrence of a string representing a hyperlink and to associate individual ones of identified string occurrences with individual ones of colors associated with the manual user data entry device of said wireless device using a zone approach in which a color of a hyperlink is reassigned as the hyperlink is repositioned in a viewable window of the display, wherein individual ones of colors associated with the manual user data entry device of said wireless device are illuminable character-entry pressure points such that when one of the character-entry pressure points is selected by a user substantially only that character-entry pressure point is illuminated.

27. A wireless device as in claim 26, where said CPU is further programmed to illuminate said manual user data entry device with a sufficient number of colors to represent the identified string occurrences.

28. A wireless device as in claim 26, where said wireless device comprises one of a mobile phone, a pager and an electronic organizer.

29. A wireless device as in claim 28, where said file is received through a wireless link using a wireless transceiver having an output coupled to said CPU.

30. A method for selecting a navigation function in a markup language file comprising:
reading the markup language file in a wireless device;
detecting a reference to a character encoding having a corresponding navigation function;
color coding and displaying the navigation function on a display screen of the wireless device;
illuminating a character-entry pressure point corresponding to the character encoding when the character-entry pressure point is selected without significant illumination of nearby unselected character-entry pressure points, wherein a color associated with a character-entry pressure point corresponds to a color of the corresponding navigation function;
detecting a pressure actuation of the character-entry pressure point;
triggering the navigation function; and
reassigning the color of a navigation function when the navigation function moves on a display screen of the wireless device.

* * * * *